US012002375B2

(12) United States Patent
Wigh et al.

(10) Patent No.: US 12,002,375 B2
(45) Date of Patent: Jun. 4, 2024

(54) APPARATUS, SYSTEM AND METHOD FOR AN ELECTRONICALLY ASSISTED CHESSBOARD

(71) Applicant: Bryght Labs, Inc., Overland Park, KS (US)

(72) Inventors: Jeffrey Bowman Wigh, Overland Park, KS (US); Adam Wesley Roush, Lenexa, KS (US); Justin William Farrell, Overland Park, KS (US); Elliot Samuel Wilder, Prairie Village, KS (US)

(73) Assignee: Bryght Labs, LLC, Overland Park, KS (US)

( * ) Notice: Subject to any disclaimer, the term of this patent is extended or adjusted under 35 U.S.C. 154(b) by 0 days.

(21) Appl. No.: 18/397,640

(22) Filed: Dec. 27, 2023

(65) Prior Publication Data

US 2024/0127713 A1   Apr. 18, 2024

Related U.S. Application Data

(63) Continuation of application No. 17/521,704, filed on Nov. 8, 2021, now Pat. No. 11,893,900, which is a
(Continued)

(51) Int. Cl.
*G09B 5/02* (2006.01)
*G09B 19/22* (2006.01)

(52) U.S. Cl.
CPC .............. *G09B 19/22* (2013.01); *G09B 5/02* (2013.01)

(58) Field of Classification Search
CPC .................................. G09B 5/02; G09B 19/22
(Continued)

(56) References Cited

U.S. PATENT DOCUMENTS 3,888,491 A   6/1975 Bernard et al.
4,391,447 A   7/1983 Dudley
(Continued)

FOREIGN PATENT DOCUMENTS

WO   2012116233 A2   8/2012

OTHER PUBLICATIONS

International Search Report and Written Opinion, dated Dec. 7, 2021, for International Application No. PCT/US2021/050356.
(Continued)

*Primary Examiner* — Kesha Frisby
(74) *Attorney, Agent, or Firm* — Build IP, LLC; Robert V. Donahoe (57) ABSTRACT

An electronic chess set includes a plurality of conductive chess pieces, a chessboard having a playing surface including a plurality of individually identifiable locations visible to a user on the chessboard, and an electronic system including a capacitive sensing system. In some embodiments, the capacitive sensing system is configured to determine for each of the plurality of individually identifiable locations: when a chess piece included in the plurality of conductive chess pieces is located at a respective one of the plurality of individually identifiable locations and user-contact with the chess piece is absent; when the chess piece located at the respective one of the plurality of individually identifiable locations is in contact with the user; and when each of the plurality of conductive chess pieces is absent from the respective one of the plurality of individually identifiable locations.

20 Claims, 6 Drawing Sheets

Related U.S. Application Data continuation-in-part of application No. 17/022,341, filed on Sep. 16, 2020, now Pat. No. 11,217,117.

(58) Field of Classification Search
USPC .......................................................... 434/128
See application file for complete search history.

(56) References Cited

U.S. PATENT DOCUMENTS

| | | | |
|---|---|---|---|
| 5,462,281 | A | 10/1995 | Gaito et al. |
| 6,168,158 | B1 | 1/2001 | Bulsink |
| 6,446,966 | B1 | 9/2002 | Crozier |
| 8,517,383 | B2 | 8/2013 | Wallace et al. |
| 8,525,799 | B1 | 9/2013 | Grivna et al. |
| 8,702,515 | B2 | 4/2014 | Mineur et al. |
| 9,618,316 | B2 | 4/2017 | Zachut et al. |
| 10,108,271 | B2 | 10/2018 | Flagg et al. |
| 10,150,039 | B2 | 12/2018 | Thomas et al. |
| 2004/0065999 | A1 | 4/2004 | Syed et al. |
| 2009/0315258 | A1 | 12/2009 | Wallace et al. |
| 2009/0322026 | A1 | 12/2009 | Sun et al. |
| 2014/0032146 | A1 | 1/2014 | Wallace et al. |
| 2014/0084539 | A1 | 3/2014 | Dolk |

OTHER PUBLICATIONS

Schulz et al., "ChessMate Capstone Final Presentation," https://web.ece.ucsb.edu/Faculty/Johnson/ECE189/final/chessmate.pdf, Aug. 3, 2016.

Desantis et al., "Knight Light LED Chess," https://www.ece.ucf.edu/seniordesign/fa2012sp2013/g16/pdfs/sd1.pdf, Dec. 2012, published at least as early as Apr. 14, 2020.

Arduino Team, "This Maker Built a Game Board that Lights up Correct Moves," Arduino, https://blog.arduino.cc/2017/04/17/this-maker-built-a-game-board-that-lights-up-correct-moves/, Oct. 20, 2018.

Chess News, "ChessBase 14: It Helps You to Play Better!" Chess Base, https://web.archive.org/web/20161208140820/http://en.chessbase.com/post/chessbase14-assisted-analysis-tutorial, Dec. 8, 2016.

European Supplementary Search Report and Opinion, dated Feb. 28, 2024, for corresponding European Application No. 21870084.

| Position in FIG. 1A | Move-category | Category ID |
|---|---|---|
| A6 | = excellent | 122 |
| D1 | = inaccuracy (ok) | 124 |
| C1, B1, A4 | = mistake (bad) | 126 |
| A2, A3, A5 | = blunder (terrible) | 128 |

APPARATUS, SYSTEM AND METHOD FOR AN ELECTRONICALLY ASSISTED CHESSBOARD

BACKGROUND OF INVENTION

1. Field of Invention

This invention relates generally to electronic game boards. More specifically, at least one embodiment, relates to an apparatus, system and method for an electronically assisted chessboard.

2. Discussion of Related Art

Prior approaches attempt to track a location of a chess piece using technologies such as inductive sensing systems, capacitive sensing systems and RFID systems, respectively. Where either inductive sensing technologies or RFID sensing technologies are employed, one or more of an electrical coil, an antenna, and an integrated circuit must be included in each chess piece. Capacitive sensing technologies require that each chess piece includes a conductive bottom surface. To achieve this, prior approaches apply a conductive sticker or label to the underside of the chess piece. While the detection of a user's interaction with game pieces (for example, touching a game piece) is known in general, these approaches are not provided for chessboards. Further, prior approaches that detect a user's interaction with a game piece employ multiple sensing systems where a first system detects contact and a second system determines the location of a game piece at a known location on a surface. For example, the disclosure of WO2012/116233 A2 describes that some capacitive sensors can be employed as touch sensors while other capacitive sensors are used to determine the presence of game pieces at a given location.

Electronic chessboards typically employ a traditional printed circuit board (PCB) on which the electronic components are located, for example, sensing circuitry, illumination hardware and processing circuitry. This traditional hardware adds rigid bulk with the inclusion of the PCB to house the preceding elements of the electronic system.

SUMMARY OF INVENTION

Therefore, there is a need for chess sets that employ a single capacitive sensing system to determine both when a chess piece is touched by a player and the locations of chess pieces on the chessboard. In various embodiments, the approaches described herein perform event detection to determine a state change that can include player contact with a piece and movement of the pieces on the chessboard. According to some embodiments, a mutual capacitive sensing system is operative to determine at least three detectable states at any given location on a chessboard. In one embodiment, the at least three detectable states include: 1) a chess piece is not present at the location; 2) a chess piece is present at the location and untouched; and 3) a chess piece is present at the location and is being touched by a user. In further embodiments, the chess pieces employed with the mutual capacitive sensing system are manufactured from non-metallic material that provides a conductive surface for substantially all of the surface of the chess pieces. In various embodiments, the chess pieces do not include a conductive exterior coating. Instead, the materials of manufacture are modified to provide a fully conductive chess piece. According to one embodiment, the chess pieces are manufactured from a plastic blend that includes an addition of carbon fiber. According to other embodiments, the chess pieces are manufactured from a plastic blend that includes an addition of metal such as steel, stainless steel, silver or copper. Depending on the embodiment, the conductive material included in the body of a chess piece can be a particle. In some embodiments, the particles can include any one or any combination of conductive fiber particles, conductive powdered particles or other forms of conductive particles. In various embodiments, the chess pieces are manufactured from a polycarbonate plastic blend. Embodiments described herein employ conductive chess pieces in combination with a capacitive sensing system to detect changes in the mutual capacitance at the locations of the board to detect changes in state for the locations. These can includes changes caused by either or both of presence of a chess piece at a location on the playing surface and human contact with a chess piece located on the playing surface.

It is also advantageous to provide a chessboard having a stack of layers including a mutual capacitive sensing circuit layer and a digital graphics substrate that are at least partially transparent when lit by LEDs located beneath the stack where the chessboard provides a top surface that appears opaque when unlit by any of the LEDs. Further, there is a need to provide the preceding with a mutual capacitive sensing circuit that operates to detect the at least three detectable states described above. According to some embodiments, the mutual capacitive sensing circuit is integrated in a flexible substrate included in one layer of the stack of layers. According to further embodiments, the flexible substrate housing the mutual capacitive sensing circuit is at least partially transparent such that it can be located above the illumination system included in the chessboard. According to still other embodiments, a rigid PCB is employed in the chessboard. In one of these embodiments, the rigid PCB includes both the capacitive sensing circuitry and LEDs employed to illuminate the playing surface.

According to one aspect, an electronic chess set includes a plurality of conductive chess pieces, a chessboard having a playing surface including a plurality of individually identifiable locations visible to a user on the chessboard, and an electronic system including a capacitive sensing system. In some embodiments, the capacitive sensing system is configured to determine for each of the plurality of individually identifiable locations: when a chess piece included in the plurality of conductive chess pieces is located at a respective one of the plurality of individually identifiable locations and user-contact with the chess piece is absent; when the chess piece located at the respective one of the plurality of individually identifiable locations is in contact with the user; and when each of the plurality of conductive chess pieces is absent from the respective one of the plurality of individually identifiable locations.

According to another aspect, a method of sensing user interactions with chess pieces at locations on a chessboard which has a playing surface where the chessboard is included in a chess set that also includes a plurality of chess pieces. According to some embodiments, the method includes: for a selected location on the playing surface of the chessboard, sensing a first capacitance value when each of the plurality of chess pieces is absent from the selected location; for the selected location, sensing a second capacitance value when a chess piece included in the plurality of chess pieces is located at the selected location with contact by a user absent from the chess piece, the second capacitance level being different than the first capacitance level; and for the selected location, sensing a third capacitance value when the chess piece is located at the selected location and the chess piece is in contact with the user, the third capacitance level being different than both the first capacitance level and the second capacitance level.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 1A:
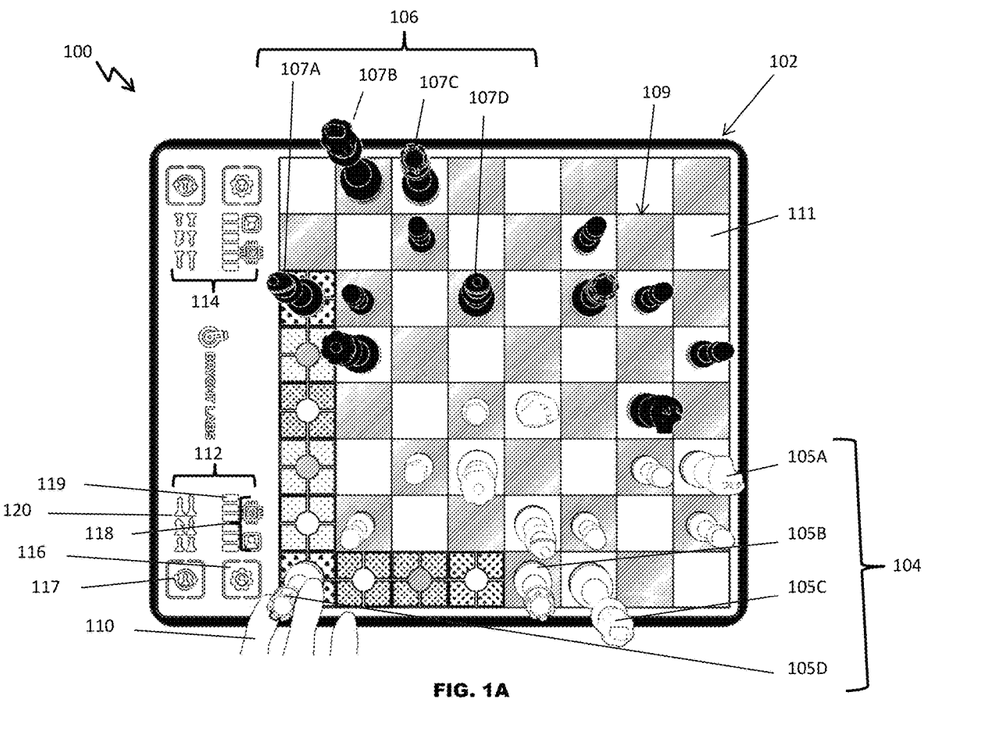
FIG. 1A illustrates an electronic game board in accordance with one embodiment.

Referring now to FIG. 1A, a chess set 100 is illustrated in accordance with various embodiments. The chess set 100 includes a chessboard 102, a first plurality of chess pieces 104, and a second plurality of chess pieces 106. A subset of each of the first plurality of chess pieces 104 and the second plurality of chess pieces 106 is identified with reference characters, respectively, for purposes of this description. According to the illustrated embodiment, the first plurality of chess pieces 104 includes a knight 105A, a first rook 105B, a king 105C and a second rook 105D. The second plurality of chess pieces 106 includes a first bishop 107A, a king 107B, a rook 107C and a second bishop 107D. As illustrated in FIG. 1A, a human player 110 is in contact with the second rook 105D.

The chessboard 102 includes a playing surface 109, a first user interface 112 and a second user interface 114. In the illustrated embodiment, the playing surface 109 includes a checkboard pattern with a plurality of individually identifiable locations, for example, the square 111. Depending on the embodiment, the playing surface 109 can include printed graphics, an illuminated grid, illuminated squares, a combination of any of the preceding or any of the preceding in combination with other features used to provide the plurality of individually identifiable locations in a manner visible to the user.

The user interfaces 112, 114 are located adjacent the playing surface 109 in the illustrated embodiment. The first user interface 112 is associated with the first plurality of pieces 104 (the white pieces) and the second user interface 114 is associated with the second plurality of pieces 106 (the black pieces). According to the illustrated embodiment, each of the two user interfaces 112, 114 include the same elements. As illustrated, these include a first button 116, a second button 117, a pair of handicap-select buttons 118, a handicap-level indicator 119 and chess-piece selection icons 120.

According to one embodiment, the chessboard 102 includes a multilayer construction that includes a top plane located at the top of a frame (not illustrated). According to further embodiments, the frame includes a hollow interior region located beneath the top plane. According to some embodiments, the interior region is suitable for housing an integral electronic system, for example, as illustrated and described with reference to FIG. 2.

In some embodiments, the top plane itself has a multilayer construction. In one embodiment, the playing surface 109 and the user interfaces 112, 114 are included as graphics printed on a top surface layer of the top plane. Depending on the embodiment, the top surface layer can include one or more semi-transparent plastic sheets with opaque graphics. As described in greater detail herein, these layers can include one or more layers that include electronic sensing and/or circuitry. Therefore, the bottom layer of the top plane can include conductive ink capacitive touch circuitry. This can include inks that are opaque and conductive. When fully assembled and located above a lighting array (also within the frame of the chess board 102), each of the individually identifiable locations, for example, the square 111 can both detect capacitive properties of the chess pieces 104, 106 and display information about the game via the playing surface 109. The display of information can include the representation of different display-elements, for example, as illustrated and described with reference to FIG. 1C.

Figure 1B:
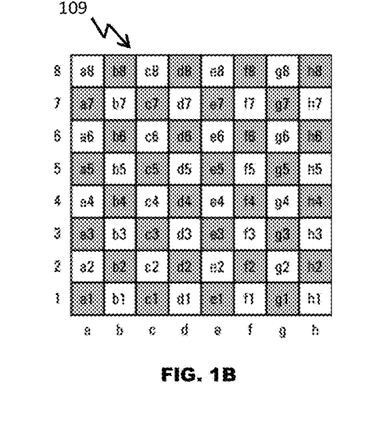
FIG. 1B illustrates algebraic notation for the electronic game board of FIG. 1A according to one embodiment.
Figure 1C:
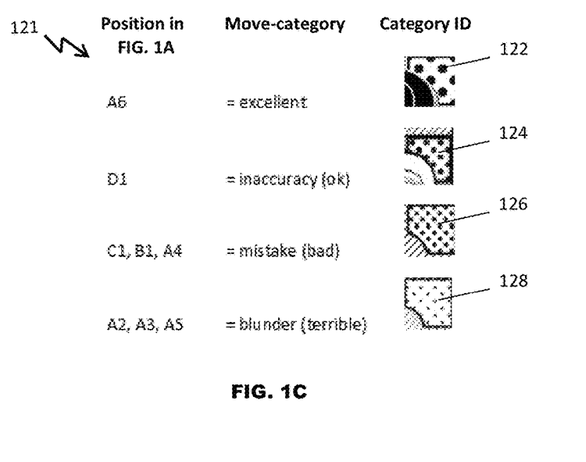
FIG. 1C illustrates a legend for the display-features employed with the electronic game board of FIG. 1A according to one embodiment.

As is described in greater detail herein, the information displayed via the playing surface 109 can include the communication of moves to the user. In various embodiments, the moves are displayed in response to the human user's selection of any one of the plurality of chess pieces, for example, a selection by the user 110 touching the second rook 105D as illustrated in FIG. 1. In general, the moves that are displayed to the user 110 can be selected for display based on the handicap-level desired for the user. That is, the handicap-level corresponding to a desired level of assistance for the user. To provide the user with an increased understanding of possible moves, a legend is employed with the chess set 100 to distinguish the strength of various moves. FIGS. 1B and 1C provided additional background concerning the preceding.

FIG. 1B illustrates the system of coordinates used to uniquely identify each square on the chessboard. Each square of the chessboard is identified by a unique coordinate pair—a combination of a letter and a number. The vertical columns of squares are labeled a through h from white's left to right. The horizontal rows of squares are numbered 1 to 8 starting from white's side of the board. Thus, each square has a unique identification of a letter followed by a number. For example, the square 111 is unique identified by the alphanumeric ID of "h7".

Referring to FIG. 1C, a legend 121 for the respective display-elements used to represent various move-categories when displayed by the chessboard 102 is provided in accordance with one embodiment. The legend includes a leftmost column that refers to the unique identifier where one of the move-categories appears in FIG. 1A. The center column of the legend 121 describes a strength of the move-category. The leftmost column illustrates the display-element that is used to represent the move-category. In the illustrated example, the leftmost column includes a first display-element 122, a second display-element 124, a third display-element 126 and a fourth display-element 128.

In FIG. 1C, the display-element that is employed to differentiate between move categories is a polka dot pattern in which the size of the dots increases as a strength of the move-category increases. As indicated in the legend 121, the first display-element 122 includes a field of the largest polka dots. The first display-element 122 is representative of an excellent move and can be found at position A6 on the playing surface 109 in FIG. 1A. The second display-element 124 includes a field of the polka dots having the next largest size. The second display-element 124 is representative of an inaccurate move and can be found at position D1 on the playing surface 109 in FIG. 1A. The third display-element 126 includes a field of slightly smaller polka dots. The third display-element 126 is representative of a mistake and can be found at positions B1, C1 and A4 on the playing surface 109 in FIG. 1A. The fourth display-element 128 includes a field of the smallest polka dots. The fourth display-element 128 is representative of a terrible move and can be found at positions A2, A3 and A5 on the playing surface 109 in FIG. 1A. As is described in greater detail below, the illumination of move-categories can employ color to distinguish one move category from the other move categories. In various embodiments, the color illumination is provided by a controlling an operation of RGB LEDs included in a lighting array. According to one embodiment, the illumination is controlled to maintain moves in a selected move-category illuminated but not distinguished to more rapidly increase the user's understanding of the game of chess. As one example, moves categorized as blunders can be illuminated in a red color with the other highlighted moves all illuminated in a white color. This example can assist a player in avoiding blunders while providing them with the freedom to choose among the other available moves without aid.

The quantity and type of move-categories can vary depending on the embodiment. According to one embodiment, a total of seven move-categories are employed including the categories blunder, mistake, inaccuracy, good, excellent, best and brilliant. Further, all move-categories may not be highlighted where, for example, moves in fewer than all the defined move-categories are available given the selected game piece and game state. In some instances, there will be no moves displayed, for example, where the selected game piece is in a position that is blocked from movement by other pieces on the playing surface 109.

While the above description concerning the display-elements 122, 124, 126, 128 describes a dot-size as a distinguishing feature, the use of RGB LEDs allows the different display-elements to be distinguished by color either alone or in combination with other features. The use of a lighting mask allows the other features to include both patterns and shapes that distinguish various display-elements from one another. The patterns and shapes can also be combined with color variations and/or light intensity. In some embodiments, light intensity can be varied to attract the user's attention to a move that is important for them to understand (for example, blinking or pulsing). According to some embodiments, display-elements can be established to clearly identify a rank among moves in a single move-category.

Figure 2:
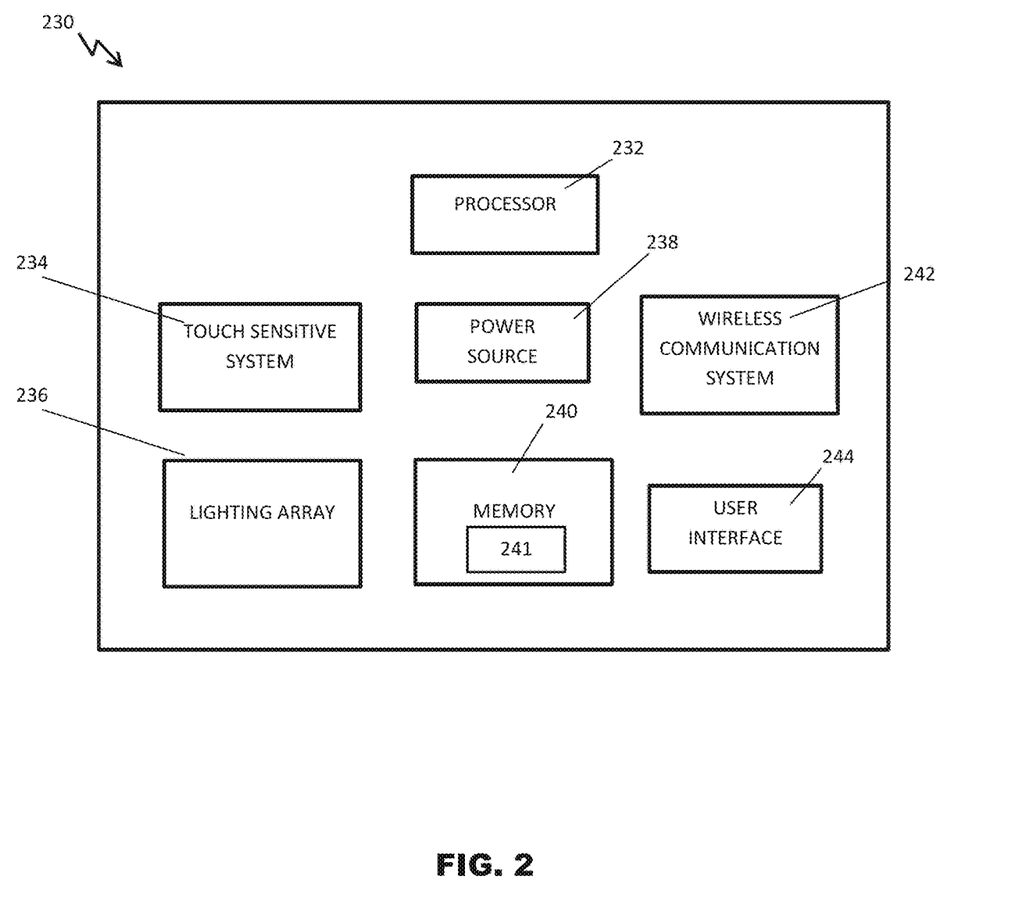
FIG. 2 illustrates a system level block diagram of an electronic system in accordance with one embodiment.

Referring now to FIG. 2, an electronic system 230 for inclusion in a chess set is illustrated in accordance with various embodiments. In some embodiments, the elements included in the electronic system 230 are all housed in the chessboard 102 illustrated in FIG. 1A. The electronic system 230 includes a processor, a touch sensitive system 234, a lighting array 236, a power source 238, a memory 240, a wireless communication system 242 and a user interface 244. The electronic system 230 can include one or more power busses and one or more communication busses. The communication busses can be used for the communication of instructions/commands and data between the illustrated components and other components included in the device depending on the embodiment. The power busses can be used to distribute operating power at one or more voltage levels to the elements of the electronic system 230.

Depending on the embodiment, the processor 232 can include one or more of a microcontroller, microprocessor or other processing element. According to one embodiment, the processor includes an integral BLUETOOTH low energy wireless communication system. In general, the processor 232 executes stored instructions to control the overall operation of the chessboard, a processing of input received from the touch sensitive system 234, operation of the lighting array to provide information to the user in response to receipt of a touch input or provide other feedback to the user(s). The processor 232 operates to perform other functions and operations depending on the embodiment. For example, the processor 232 can operate to process various types of inputs, for example, commands, instructions or prompts received via the user interfaces 112, 114 and/or from a user's electronic device. According to one embodiment, the processor 232 is included in a microcontroller that also includes capacitive-touch I/O, a BLUETOOTH communication system and memory.

The touch sensitive system 234 can employ different touch-sensitive technology depending on the embodiment. According to some embodiments, a capacitive sensing system is employed. A capacitive sensing system can include a capacitive sensing array in contact with the playing surface 109, for example, as a part of the top plane initially described with reference to FIG. 1A. The capacitive sensing circuit can employ self-capacitance or mutual capacitance depending on the embodiment. In addition, the capacitive circuitry can be laid out as individual sensors with one sensor per playing square (for example, including a sensor for the square 111). Alternatively, the capacitive sensing system can include sensing by row and column at an 8×8 resolution or higher resolution grid if desired. According to these embodiments, each of the chess pieces 104, 106 is conductive. The preceding can be achieved by a variety of ways depending on the embodiment. For example, the chess pieces 104, 106 can be manufactured from a conductive material. According to another embodiment, the chess pieces 104, 106 are manufactured from a non-conductive material but include a conductive exterior finish, for example a conductive paint, lacquer or other surface coating. In further embodiments, the chess pieces 104, 106 are manufactured from non-metallic material that provides a conductive surface for substantially all of the surface of the chess pieces. In various embodiments, the chess pieces 104, 106 do not include a conductive exterior coating. Instead, the materials of manufacture are modified to provide a conductive chess piece.

In various embodiments, each chess piece is manufactured as a solid piece having a substantially uniform conductivity throughout the chess piece. According to one embodiment, the chess pieces 104, 106 are manufactured from a plastic blend that includes an addition of carbon fiber. According to other embodiments, the chess pieces are manufactured from a plastic blend that includes an addition of metal such as steel, stainless steel, silver or copper. Depending on the embodiment, the conductive material included in the body of a chess piece can be a particle. In some embodiments, the particles can include any one or any combination of conductive fiber particles, conductive powdered particles or other forms of conductive particles. In various embodiments, the chess pieces are manufactured from a polycarbonate plastic blend. According to one embodiment, chess pieces manufactured from a conductive blend have a volume resistivity of less than 100 ohm-cm. However, applicant has found that chess pieces having volume resistivity less than approximately 10,000 ohm-cm have sufficient conductivity. Further, improvements that increase the signal-to-noise abilities of capacitive sensing solutions may allow the use of less conductive materials in the future. According to another embodiment, a carbon fiber is included in the black chess pieces while a metal fiber is employed with the white chess pieces. This approach is advantageous to avoid the effect carbon fibers can have on a color of the white pieces. According to still another embodiment, each chess piece is manufactured from metal, for example, as a solid metal piece having a substantially uniform conductivity throughout the chess piece.

Where capacitive sensing is employed, the change in capacitance (for example, a change in the mutual capacitance or inverse thereof) is sensed by the touch sensitive system 234 when a user makes contact by touching a selected one of the chess pieces 104, 106. The processor 232 employs the information concerning the change in capacitance to determine a location on the playing surface 109 where the selected chess piece is located. With this information the processor identifies the set of moves that are currently available for the selected chess piece.

According to another embodiment, the touch sensitive system 234 employs a membrane keypad, for example, a flexible membrane keypad that is included in the top plane. The flexible membrane can include a checkerboard pattern, for example, as typically found in a chessboard. So, while the membrane is referred to as a "keypad" the "keys" can be provided as an alternating grid of light and dark squares without any indicia. According to this embodiment, the chess pieces 104, 106 are not conductive. Instead, the user applies a downward force to press the selected chess piece onto the playing surface 109. This pressure flexes the membrane to complete an electrical contact located beneath the top surface of the membrane. Here too, the processor 232 employs the information received from the touch sensitive system 234 to determine a location on the playing surface where the selected chess piece is located. With this information the processor identifies the set of moves that are currently available for the selected chess piece. The operations of the system described herein concerning a display of available moves and available move-categories on the chessboard 102 can be provided in each of the various embodiment of the touch sensitive system 234.

The lighting array operates to provide backlighting to the playing surface 109. For example, the lighting array 236 is employed to illuminate the playing surface 109 with one or more available moves in a manner that also conveys the move-category (for example, a strength of a move). In some embodiments, the backlighting can also be employed to assist in defining the playing surface and/or operation of the user interfaces 112, 114. The lighting array 236 includes a plurality of LEDs in accordance with one embodiment. In some embodiments, the lighting array 236 includes color RGB LEDs.

The power source 238 can include one or more batteries, for example, lithium or alkaline batteries. Further, the power source 238 can include a replaceable power source or a rechargeable power source depending on the embodiment. Where a rechargeable power source is employed, the power source 238 can include recharging circuitry to regulate charging operations. The recharging circuitry can include a wired electrical connection available from an exterior of the chessboard 102. According to another embodiment, wireless inductive charging is used to recharge the power source 238 included in the electronic apparatus 230.

The memory 240 is configured to store software instructions 241 in accordance with various embodiments. The software instructions can include one or more algorithms or other programs, for example, algorithms for determining a chess piece selected by the user, determining each of the moves available for a given state of a chess match, determining the move-strength and associated move-category of available moves, determining a player's selection of a game piece and displaying the moves available to the player for the selected game piece given the game-state and in view of the player's handicap. In one embodiment, the memory 240 is included in the processor 232. In another embodiment, the memory 240 includes memory internal to the processor 232 and memory external to the processor 232.

Depending on the embodiment, the wireless communication system 242 can include BLUETOOTH or BLUETOOTH LE wireless communication systems, respectively, or Wi-Fi communication. The wireless communication system 242 can be included as a standalone element or included in the processor 232 depending on the embodiment. According to some embodiments, the wireless communication system 242 can operate to communicate with a user's personal electronic device when the chessboard 102 is in use.

In operation, the electronic system 230 receives a user input via either or both of the user interfaces 112, 114 to establish the parameters for a chess match. Operations that provide the electronic system 230 with information employed during the match can include: identifying whether the match is between the user and another human or an AI opponent, for example, using the first button 116; locating the chess pieces on the board at the start of a match, for example, using the second button 117 and the chess-piece selection icons 120; and establishing a handicap level for either a human player or an AI opponent using the handicap-select buttons 118.

Figure 3:
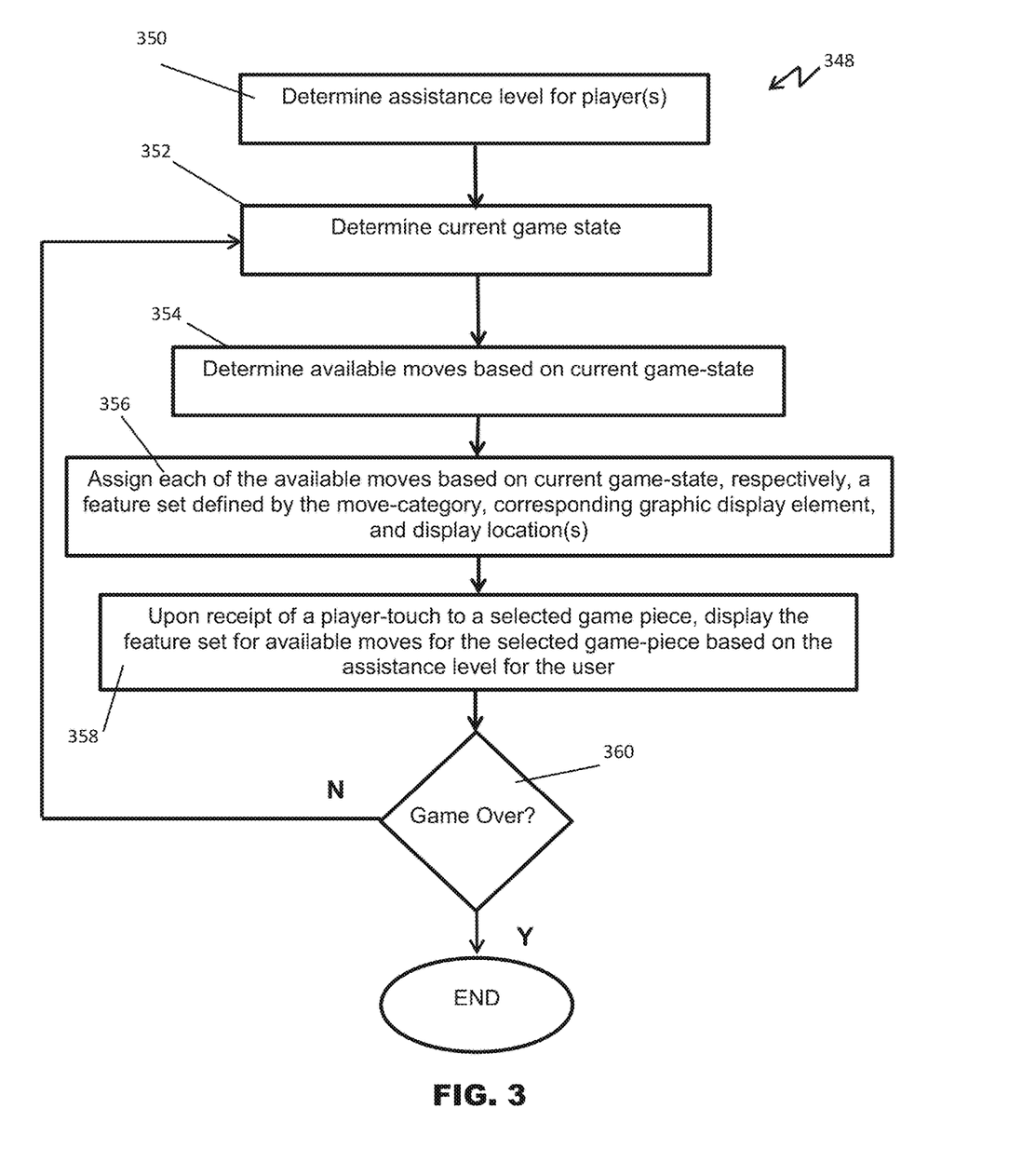
FIG. 3 illustrates a flow diagram of a process employed with the electronic game board of FIG. 1A according to one embodiment.

Referring now FIG. 3, a flow diagram of a process 300 that employs an integral electronic system to control a display of moves in a chess match is illustrated in accordance with one embodiment. The process 300 illustrates a series of operations that can be employed to determine each of the moves available for a given state of a chess match, determine a player's selection of a game piece and customize the highlighting of the moves available to the player for the game piece given the game-state and in view of the player's handicap. In some embodiments, the process employs a touch-based identification of the chess piece selected by the user.

In FIG. 3, the following operations are included in the process 348: determining an assistance level for the player (s) 350; determining a current game-state 352; determining available moves based on the current game-state 354; assigning a move-category to each of the available moves 356 and displaying a feature set for available moves when a player selects a game piece 358. The process 348 also includes a decision point to determine whether the game is over 360.

The process 348 begins at the act of determining an assistance level for the players in a chess match 350. The players can include a human user and an AI opponent or two human players competing against one another. Where the match is played by two human users, the assistance level can correspond to a handicap level that the user(s) select at the start of a match. Where the match is between a human user an AI opponent the user selects a handicap level for himself and a handicap level for the AI opponent. In various embodiments, the handicap level can provide nuanced differences in the manner in which the available moves are highlighted for the human user(s). For example, the element of user-driven discovery is present in embodiments where moves are not presented unless a user actually selects a chess piece. Even then, the moves that are displayed are only those that are available for the selected chess piece.

Additional refinement is available because a user's handicap level can result in different forms of highlighting to selectively distinguish, or not, the various categories of moves. That is, in some embodiments, a separate color is used to distinguish moves in each move-category from moves in other move categories. Optionally, fewer than all available move-categories are distinguished as a result of the handicap selected for the user. According to these embodiments, the moves in all move categories can be illuminated in a manner that distinguishes the moves in at least one move-category from the moves in the other move categories. In some embodiments, moves in a plurality of move-categories are separately distinguished from one another using colored illumination (i.e., illumination using a unique color for each move-category) and moves in a plurality of different move-categories are all illuminated in a common color that does not distinguish these move-categories from one another. In addition, the electronic system 230 can operate to evaluate a user's skill in a prior match or matches and automatically adjust a player's handicap level for subsequent matches.

The user input(s) at the start of the match can also include setting up the board by positioning all pieces at a starting point. This can include locating each piece on the playing surface 109 and providing the electronic system 230 with inputs that allow the system to identify the starting location of each piece on the board. In addition, the user input can include identifying the player whose turn it is, whether castling options are available in the match, whether pawn promotion is available and whether en passant capture is available in the match.

With the assistance level known, the process 348 moves to determining the current game-state 352. At the start of a match, the user input concerning the match setup is employed by the electronic system 230 to determine a current location of each piece on the playing surface 109, for example, using the coordinate system illustrated and described with reference to FIG. 1B. Following the initial move and thereafter, the electronics system 230 detects a change in location of a chess piece upon completion of a move. In one embodiment, the electronic system 230 employs capacitive sensing to determine the change in location of a chess piece upon completion of a move. In another embodiment, the user first presses the chess piece downward on the playing surface at the original location of the piece to activate a first membrane switch and does the same at the location of the chess piece upon completion of the move. With the chess pieces in these known locations the electronic system 230 determines the current game-state at the act 352.

With the game-state known, the process 348 moves to determining available moves based on the current game-state 354. Here, the electronic system 230 employs the pre-defined moves associated with each chess piece, respectively, along with the current location of the game pieces on the playing surface 109 to determine the availability of moves for each of the chess pieces currently located on the playing surface 109. The user input concerning the availability and definition of specialty moves such as castling, pawn promotion and en passant capture is also employed. According to one embodiment, the act of determining the current game state 352 and the act of determining available moves based on the current game-state 354 are combined in a single act. According to one embodiment, the process can include a determination of available future moves one or two turns ahead based on predicted moves. This approach can speed up the processing and display of moves when a match is being played in a fast-play format.

The process 348 continues by assigning a feature set to each of the available moves 356. According to this embodiment, this act includes identifying the move-category, corresponding display-element, and display location(s) for each of the available move(s). In one embodiment, the available move-categories and associated display-elements include those illustrated and described with reference to FIG. 1C. However, other categories and display-elements can be employed depending on the embodiment. According to some embodiments, the process employs a point-based scoring system to rank available moves where a first range of scores is associated with a first move-strength, a second range of scores is associated with a second move strength and additional ranges are associated with different categories of move strengths. In one embodiment, the score is established using a scoring system based on a unit of measure referred to as a "centipawn" which is known in the art. According to this embodiment, a centipawn equals $1/100$ of a pawn and 100 centipawns=1 pawn and total scores can range from −100 (signifying a black victory) to +100 (signifying a white victory). According to one embodiment, the move-category is established based on a probability of winning rather than the centipawn scoring system.

In some embodiments, the electronic system 230 operates a process in which it searches a game tree to determine the score for a move based on a series of post-move outcomes that can result. According to one embodiment, this includes a min-max algorithm using alpha-beta pruning to decrease the number of nodes that are evaluated, for example, by evaluating available moves based on the players making an optimal move at each of the forward looking game-states. According to another embodiment, a monte-carlo algorithm is employed. According to this embodiment, the process operates by trying random moves, identifying those that are the most promising and further exploring results of those moves in more depth. In general, these approaches operate by trying moves and working backwards to determine the strength of a move that is currently available based on the game state. In a further embodiment, the move-strength for the opening series of moves in a match is determined using a library of moves that are known to be good. According to some embodiments, a neural network is employed to evaluate available moves and classify the moves by move-strength.

The different move-categories and associated display-elements are established before the start of a match by the user, the AI chess assistant or a combination of the two. The electronic system 230 processes the inputs, the calculated move-strengths and operates to display the moves such that they are visible on the playing surface 109 in the manner that communicates the move-strength to the user. The locations of the display correspond to selected ones of the individually identifiable locations (for example the square 111) on the playing surface that correspond to the destination of the selected chess piece, for example, the second rook 105D.

According to the illustrated embodiment, the feature set for available moves is not displayed until a player selects a game piece. FIG. 3 refers to a "player-touch." The preceding is consistent with the rules of chess that allow a user to grasp a piece and temporarily move it to another position on the chessboard provided that they keep the selected chess piece in their grasp. The location of the chess piece is established at the location on the board where the player releases their grasp. There are multiple approaches that can be employed by the electronic system 230 to determine when a player selects a piece by "touch." These can include capacitive sensing where touch alone is enough for the system to detect the selection. However, other embodiments can require that the user apply a light pressure on the chess piece in a direction of the playing surface to complete an electrical contact provided by a membrane keypad.

Once the electronic system 230 identifies that a move is complete, the process 348 moves to the act of determining whether the game is over 360, for example, a checkmate or stalemate condition exists. If the game is complete, the process 348 ends. Alternatively, where the game is on-going, the process 348 returns to the act of determining the current game-state. Here, the location of each piece on the chessboard is determined following the immediately preceding move. Depending on the move (for example, whether or not a piece is captured) the updated game state can include a change in location of one or two chess pieces.

Referring to FIG. 1A again to describe the process 348, the user 110 is in contact with the second rook 105D. As a result, the moves available in a plurality of move-categories as defined by the strength of the move are displayed by the electronic system 230 on the board 102. In the illustrated example, all legal moves available with the selected chess piece are displayed using different display-elements to represent different move-categories, respectively. The display-elements can be created using a variety of approaches depending on the embodiment. In some embodiments, color RGB LEDs are employed to illuminate the playing surface and the user interfaces. In one embodiment, an LED backplane is located beneath the playing surface. Additional approaches that can be used alone or combination with the preceding or one another include having multiple LEDs per independently identifiable game-board location, the use of light guides, light guide films, mirrored surfaces, lens or other light-routing techniques.

In FIG. 1A, a move of the second rook 105D from its current location to the location of black's bishop at A6 is identified as an excellent move because black's bishop is captured. This is indicated with the first display-element 122 displayed at the location A6. A single move (moving the selected piece to the location D1) is identified as an inaccurate or okay move. This is indicated using with the second display-element 124 displayed at the location D1. Moves of the second rook 105D to any of A4, B1 or C1 are identified as mistakes as indicated with the display of third display-element 126 at those three locations on the playing surface 109. Moves to any of A2, A3, A5 are identified as mistakes as indicated with the display of fourth display-element 128 at those three locations on the playing surface 109.

According to further embodiments, the electronic system 230 operates to provide adaptive assistance. In these embodiments, the system evaluates the handicap of the players during play in view of the current likelihood of winning to determine whether an in-match adjustment will provide the benefit of a more competitive match. The handicap can be changed based on the amount that a player is either ahead or behind of their opponent. Where the system 230 operates to adjust the handicap during play, the distinction of the various move-categories is modified such that the highlighting remains consistent with the handicap level of the player.

According to some embodiments, the chessboard 102 of FIG. 1 includes a layered construction that can include layers having any of the following construction either alone or in combination: layers of plastic films; digitally printed graphics; screen printed graphics; conductive inks and insulators; one or more rigid layers; and adhesive layers. Further, this approach to constructing the chessboard 102 can provide a playing surface with symbols or graphics that are not readily visible unless the graphics/symbols are lit up with the lighting array 236 of FIG. 2. The result is referred to as a "deadfront" design. In various embodiments, a conductive ink circuit included in the layers and hidden from view forms a part of a capacitive touch sensing system. According to one embodiment, the capacitive touch sensing system senses mutual capacitance.

Figure 4:
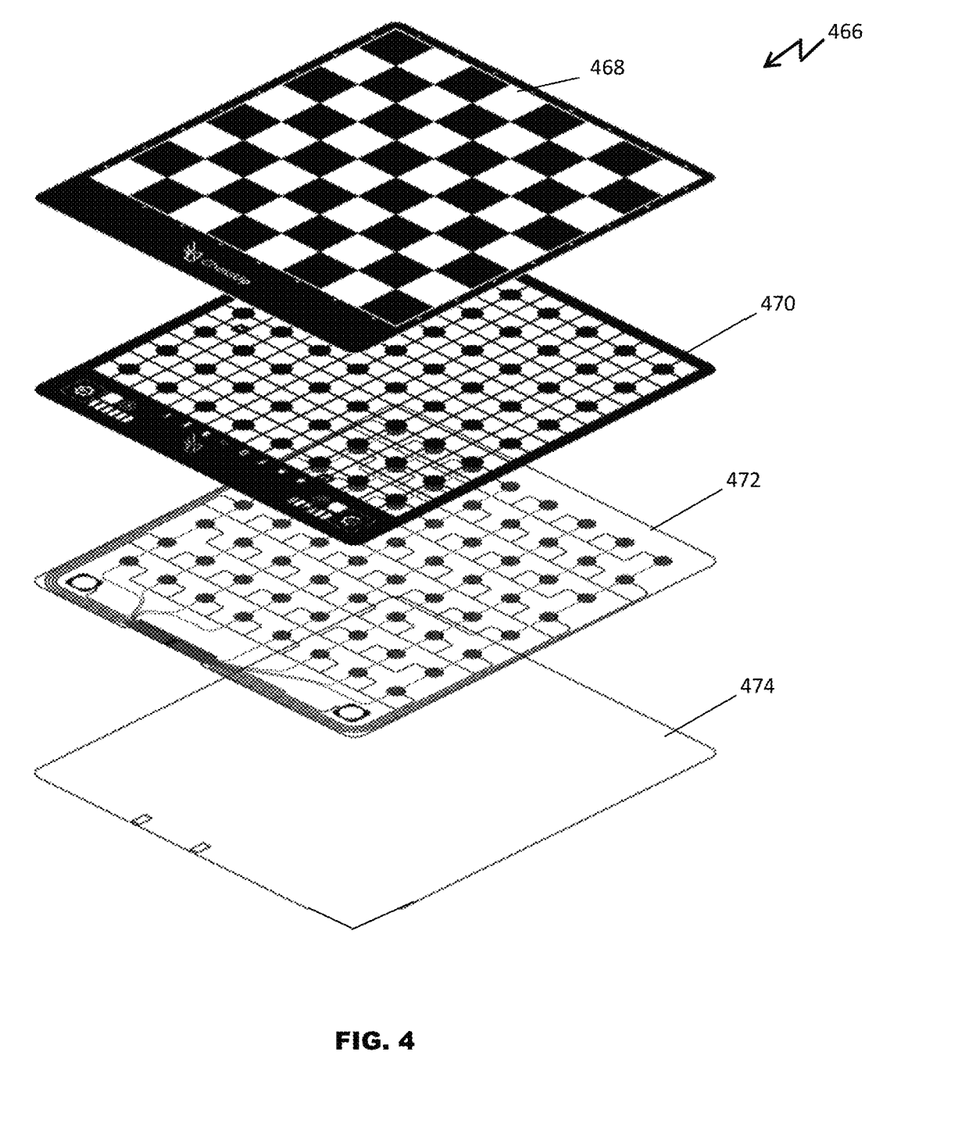
FIG. 4 illustrates layers included with the electronic game board of FIG. 1A according to one embodiment.

Referring now to FIG. 4, an exploded view of a plurality of layers 466 included with the chess board 102 is illustrated according to one embodiment. The layers 466 include a digital graphics layer 468, a mask layer 470, a circuit layer 472 and a backing layer 474. Adhesive layers (not illustrated) can be located between the plurality of layers 466. In various embodiments, the plurality of layers 466 are located above and secured to a rigid frame that provides the body of the chess board 102. According to these embodiments, the lighting array 236 is located in the body beneath the plurality of layers 466. According to further embodiments, RGB LEDs are included beneath each location on the playing surface and also beneath the user interfaces 112, 114. According to one embodiment, the circuit layer 472 includes both the capacitive sensing circuitry employed to detect state-change events and the lighting array 236. In some embodiments, the capacitive sensing circuitry and the lighting array are included in a rigid PCB.

In the illustrated embodiment, the digital graphics layer 468 is the top layer of the chessboard 102. Here, the digital graphics layer 468 provides the playing surface that is apparent to the players without any illumination by the lighting array 236. In the chess board 102, the playing surface includes the 64 separate squares where, for example, each square is a discrete location at which a chess piece may be placed.

The function of the mask layer 470 is to provide patterns and icons visible to the user when the mask layer 470 is backlit by the lighting array 236. According to these embodiments, the lighting array 236 is controlled to backlight the patterns included in the mask layer at locations on the chess board 102.

The circuit layer 472 includes the circuitry employed by the touch sensitive system 234 and the user interface 244. In some embodiments, the circuit layer 472 includes a mutual capacitive sensing system. According to one of these embodiments, the capacitive sensing system includes 8 sensor drive lines and 8 sensor receive lines distributed on the circuit layer 472 such that mutual capacitance of a drive line and a receive line is sensed at each of the 64 locations on the playing surface. In one embodiment, a sensor integrated circuit ("IC") outputs a signal that is an inverted value of the mutual capacitance sensed at the locations of the capacitive sensing array. The circuit layer 472 can also include the conductors that connect the user interfaces 112, 114 to the power and logic circuits included in the electronic system 230. According to one embodiment, the circuit layer 472 is a flexible substrate.

The backing layer 474 is employed to stiffen the plurality of layers 466 when the are assembled. According to one embodiment, the backing layer 474 is manufactured from a polycarbonate. According to another embodiment, the backing layer 474 is manufactured from Polymethyl methacrylate (PMMA).

Figure 5:
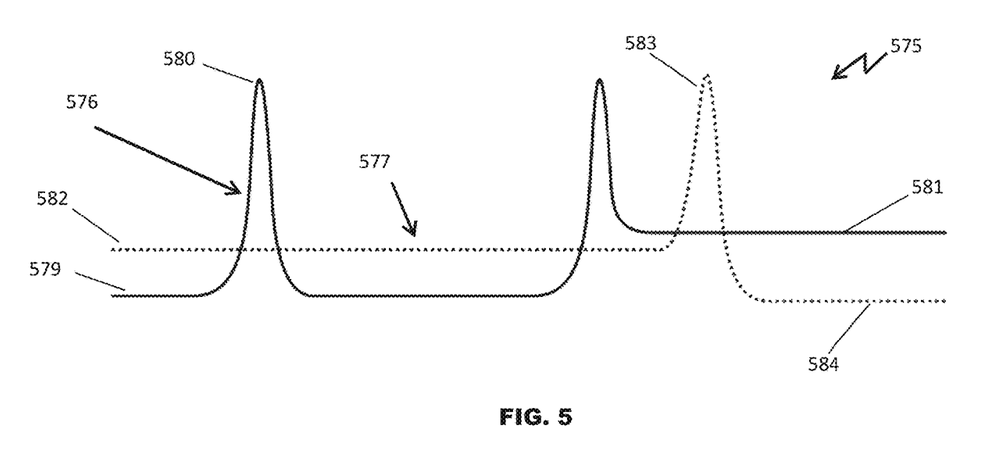
FIG. 5 illustrates waveforms provided by a capacitive sensing system according to one embodiment.

Referring now to FIG. 5, waveforms illustrating the mutual capacitance sensed at two locations are illustrated in accordance with one embodiment. According to this embodiment, an inverted output of the integrated circuit sensing the mutual capacitance is processed by the electronic system 230. In practice, a location with a chess piece touched by a user has the location with the lowest mutual capacitance. However, with an inverse of the mutual capacitance output by the capacitance sensor, the waveforms in FIG. 5 illustrate an embodiment in which the lowest mutual capacitance provides a signal having a maximum value.

The touch sensitive system 234 includes circuitry to sense mutual capacitance at each of the locations on the chess board 102, process the sensed capacitance and determine, for each location on the board, multiple states. In various embodiments, the states include: 1) a piece is present at a location but not being touched by a user; 2) a piece is not present at a location; and 3) a piece is present at a location and is being touched by the user.

FIG. 5 includes a first waveform 576 representative of a signal concerning an inverse of the mutual capacitance sensed at a first location on the chess board and a second waveform 577 representative of a signal provided at an IC output concerning an inverse of the mutual capacitance sensed at a second location on the chess board. The signals are provided at an output of an integrated circuit and provide a measure of the mutual capacitance at the respective locations on the chess board 102. According to these embodiments, the lowest level of the sensor output occurs where a chess piece is present at the sensed-location but the piece is not being touched, the highest level of the sensor output occurs where a chess piece is present and being touched, and a mid-level of the sensor output occurs at a location on the chess board where a piece is not present. The two waveforms 576, 577 are plotted with the y-axis being the inverted value of the sensed mutual capacitance and the x-axis representing time.

In view of the preceding, the first waveform 576 includes a first value of capacitance 579, a second value of capacitance 580 and a third value of capacitance 581 where each of the values 579, 580 and 581 correspond to inverted values of the mutual capacitance sensed at the first location. The second waveform includes a first value of capacitance 582, a second value of capacitance 583 and a third value of capacitance 584 where each of the values 582, 583 and 584 correspond to inverted values of the mutual capacitance sensed at the second location. The two waveforms 576, 577 illustrate a series of state-changes that result when a user touches and releases pieces during play. For example, the first value of mutual capacitance 579 has a value that indicates that a chess piece is present at the first location and is not currently being touched by a user. However, the state later changes when a user touches the chess piece at the first location. At this point in time, the value of the first waveform increases to the second value of mutual capacitance 580. Here, the chess piece remains on the playing surface at the first location with the user momentarily in contact with the piece. The chess piece is not removed from the playing surface at that time and the first waveform returns to the first value of capacitance 579 when the player releases their touch on the chess piece. At a subsequent time, the user again touches the chess piece at the first location. The value of the first waveform again increases to the second value of capacitance 580. However, the user now removes the chess piece from the first location. The state change is detected as illustrated as the first waveform changes in value to the third value of capacitance 581.

The second waveform 577 illustrates a change in state representative of a user placing a chess piece in the second location and then leaving the piece at that location to complete a move. Here, the waveform plot begins with the second waveform at a first value of capacitance 582. In the illustrated embodiment, the first value of capacitance 582 is indicative of a state where a chess piece is absent from the second location. However, the state later changes when a user places a chess piece at the second location. At this point in time, the value of the second waveform increases to the second value of capacitance 583. The user releases contact with the chess piece and leaves the piece at the second location. This act prompts a further change in the mutual capacitance sensed at the second location. The change is illustrated when the second waveform 577 decreases to the third value of capacitance 584.

Figure 6:
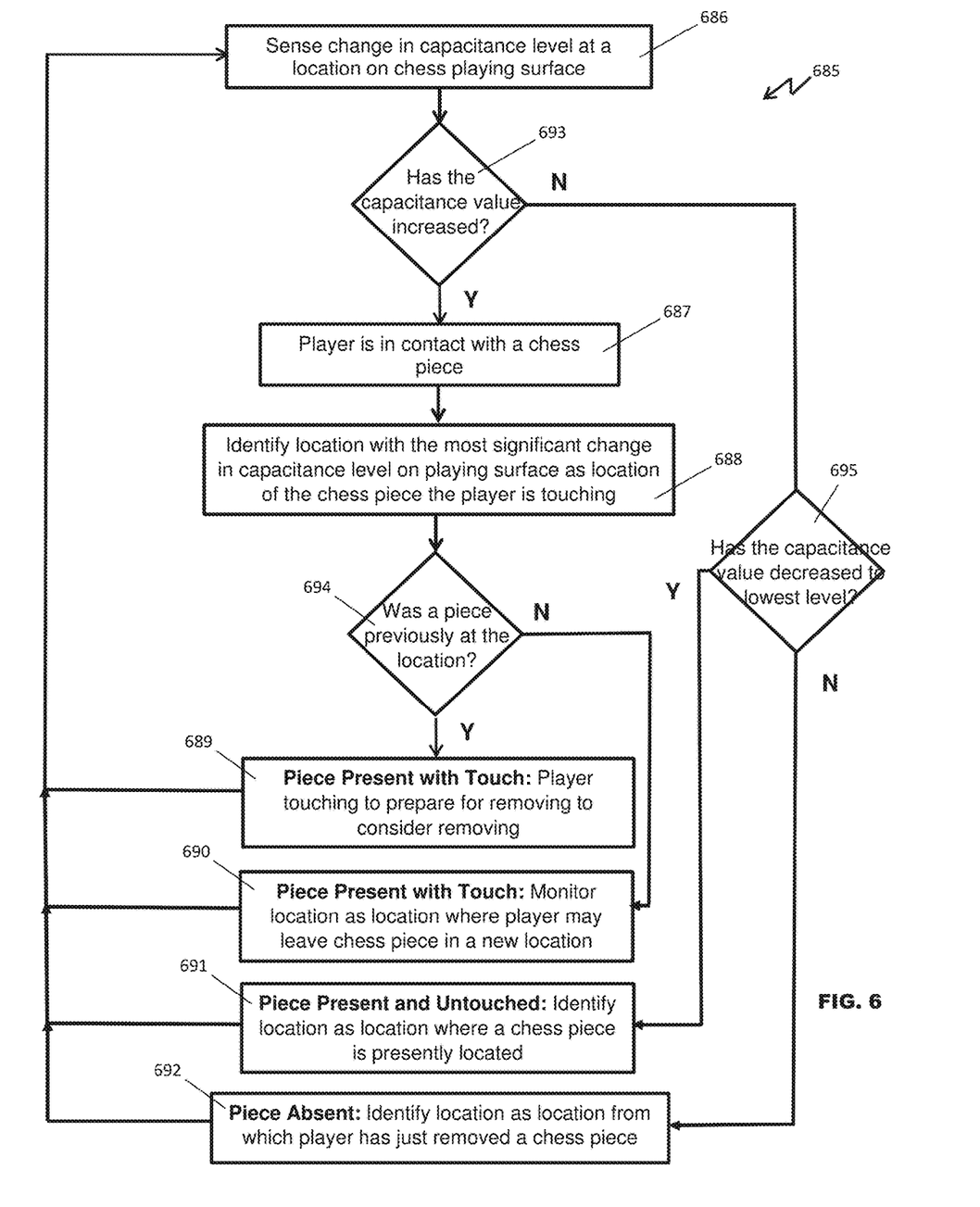
FIG. 6 illustrates a flow diagram of a process employed with the electronic game board of FIG. 1A according to one embodiment.

Referring now to FIG. 6, a flow diagram of a process 685 employed with the chess system illustrated in FIG. 1A is shown in accordance with one embodiment. The process 685 can be employed with the chess system 100 to track the position of pieces on the chess board 102 during game play. According to the illustrated embodiment, the process 685 is described with the capacitance conventions described with reference to FIG. 5. That is, processing an inverted output of the mutual capacitance that is sensed at each location on the playing surface.

In various embodiments, the process 685 includes actions and decision points. According to the illustrated embodiments, the actions include an act of sensing a change in capacitance level 686, an act of determining a player is in contact with a chess piece 687, an act of identifying a location of the most significant change in capacitance level 688, an act of determining that a piece is present with touch 689, an act of determining that a piece is present with touch 690, an act of determining that a piece is present without touch 691, and an act of determining that a piece is not present 692. According to the illustrated embodiment, the decision points included in the process 685 include an act of determining whether a capacitance value has increased 693, an act of determining whether a chess piece was previously at the location 694, and an act of determining whether the capacitance value has decreased to the lowest level 695.

According to the illustrated embodiment, the process 400 starts at an act of sensing a change in capacitance level 686. Where a mutual capacitive sensing system is included in the touch sensitive system 234, sensor drive lines and sensor receive lines located in the circuit layer are used to provide the sensor IC with a signal representative of the mutual capacitance at the individual locations on the playing surface. At the act of sensing a change in capacitance 686, the electronic system 230 processes the output of the sensor IC to detect when a change in capacitance level occurs on the playing surface.

When a change in capacitance is sensed, the process 685 moves to the act of determining whether a capacitance value has increased 693. As described above with reference to FIG. 5, the inverse of the mutual capacitance is provided as an output by the sensor IC in some embodiments. In these embodiments, the electronic system 230 processes the sensor IC output to determine when an inverse of the mutual capacitance has increased. As will be apparent to one of ordinary skill in the art in view of the disclosure provided herein, alternate embodiments can process a sensor IC output that is not inverted. Here, the process 685 can be modified to detect a decrease in mutual capacitance at the act 693. This alternate approach also impacts the act 695 which is modified to determine whether a location has increased to the highest mutual capacitance value.

Referring again to the embodiment as illustrated in FIG. 6, the process moves to the act of determining that the player is in contact with a chess piece 687 because of the increase in the capacitive sensor IC output signal. The electronic system 230 processes the output of the sensor IC to determine the location on the playing surface with the most significant change in capacitance. That location is identified as the location where the chess piece being touched by the user is located.

The result of the process 685 is a determination of the state at a location on the chess board whenever a piece is touched by the user. These states include: a first state, a chess piece is already present and being touched; a second state, a chess piece is newly placed at the location and still being touched by the user; a third state, a chess piece is presently at the location and untouched; and a fourth state, a chess piece is absent from the location.

If the system 230 determines at the act 694 that a chess piece was previously at the location with the greatest change in capacitance, the process 685 moves to the act of determining that a piece is present with touch 689. Here, the player's touch indicates that either they are preparing to move the piece from its present location or at least considering doing so. If at the act 694 it is determined that a chess piece was not previously at the location, the process 685 moves to the act of determining that a piece is present with touch 690. Here, the player's touch in combination with the new location of the chess piece indicates that either they are preparing to set the piece in the new location or at least considering doing so. Following either of the act 689 or the act 690, the process 685 returns to the act of sensing a change in capacitance level 686.

If it is determined that the sensed change in capacitance is a decrease rather than an increase at the act of determining whether a capacitance value has increased 693, the process moves to the act of determining whether the capacitance value has decreased to the lowest level 695. According to the embodiment illustrated in FIGS. 5 and 6, the lowest level capacitance results when a piece is at the location on the playing surface and untouched. Therefore, the process moves from the act 695 to the act of determining that a piece is present at the location and untouched 691 if the capacitance value has not decreased to its lowest level. Alternatively, the process moves from the act 695 to the act of determining that a piece is absent 692 if the capacitance value has decreased but to an intermediate value rather than lowest value. Following either of the act 691 or the act 692, the process 685 returns to the act of sensing a change in capacitance level 686. That is, the electronic system 230 continues to monitor information provided by the touch sensitive system 234 concerning the mutual capacitance at each location on the playing surface While shown and described with reference to a chess set, embodiments described herein can also be employed to assist a user to increase their level of skill and enjoyment of different games that use different games pieces. These can include board games like Monopoly, Go, backgammon and Chinese checkers as a non-exhaustive list of examples. In each case, the electronic system 230 is integrated into a frame that includes the game board. The playing surface can include a transparent layer and a mask and may also include a conductive layer. Where touch sensitive capacitive gamepiece detection is employed conductive game pieces can be employed in any of these embodiments. A lighting array can be included beneath the playing surface. According to these embodiments, the electronic system 230 includes algorithms employed to determine each of the moves available for a given state of the game, determine a player's selection of a game piece and display the moves available to the player for the game piece given the game-state and in view of the player's handicap.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:
1. An electronic chess set, comprising:
a plurality of conductive chess pieces;
a chessboard having a playing surface including a plurality of individually identifiable locations visible to a user on the chessboard; and
an electronic system including:
a processor; and
a capacitive sensing system coupled to the playing surface and to the processor, the capacitive sensing system configured to provide a signal representative of capacitance values sensed at the plurality of individually identifiable locations, respectively, for at least two separate states,
wherein the processor is configured to process the signal to determine for each of the plurality of individually identifiable locations: when a chess piece included in the plurality of conductive chess pieces is located at a respective one of the plurality of individually identifiable locations and user-contact with the chess piece is absent; and when the chess piece located at the respective one of the plurality of individually identifiable locations is in contact with the user, and
wherein the processor is configured to output a signal to illuminate at least one of the individually identifiable locations when the chess piece located at the respective one of the plurality of individually identifiable locations is in contact with the user.
2. The electronic chess set of claim 1, wherein the plurality of conductive chess pieces are manufactured from a substantially non-conductive plastic blended with a conductive material.

3. The electronic chess set of claim 2, wherein the conductive material includes at least one of metal or carbon fiber.

4. The electronic chess set of claim 1, wherein the capacitive sensing system includes mutual capacitance circuitry included in a flexible substrate.

5. The electronic chess set of claim 1, wherein the chessboard includes a series of layers stacked together including a top layer that provides the playing surface,
wherein the electronic system includes an illumination system configured to illuminate each of the plurality individually identifiable locations of the playing surface, and
wherein the capacitive sensing system is located between the illumination system and the playing surface.

6. The electronic chess set of claim 5, wherein the electronic system includes user-interface circuitry independent of the capacitive sensing system, and
wherein the user-interface circuitry is employed to provide the electronic system with an ability to detect a selection by the user of one or more user inputs accessible at the top surface adjacent the playing surface.

7. The electronic chess set of claim 1, wherein the capacitive sensing system is configured to sense: a first capacitance value when the chess piece included in the plurality of conductive chess pieces is located at the respective one of the plurality of individually identifiable locations and user-contact with the chess piece is absent; and a second capacitance value when the user is in contact with the chess piece located at the respective one of the plurality of individually identifiable locations, the second capacitance value being different than the first capacitance value.

8. The electronic chess set of claim 7, wherein the first capacitance value is less than the second capacitance value.

9. The electronic chess set of claim 1, wherein the plurality of conductive chess pieces are a solid mass of material having a shape of a chess piece, and
wherein conductivity of the solid mass is substantially uniform throughout the chess piece.

10. The electronic chess set of claim 1, wherein the plurality of conductive chess pieces each include a conductive coating applied to an exterior surface of the respective chess piece.

11. The electronic chess set of claim 1, wherein the electronic system is configured to identify the location of the single one of the plurality of conductive chess pieces at the respective one of the plurality of individually identifiable locations from among all of the plurality of individually identifiable locations by identifying a location having a largest change in capacitance.

12. An electronic chess set, comprising:
a plurality of conductive chess pieces;
a chessboard having a playing surface including a plurality of individually identifiable locations visible to a user on the chessboard; and
an electronic system including:
a processor; and
a capacitive sensing system coupled to the playing surface and the processor, the capacitive sensing system configured to output a signal corresponding to a capacitance value sensed by the capacitive sensing system for the plurality of individually identifiable locations, respectively, for at least two separate states,
wherein the electronic system employs the respective capacitance values sensed by the capacitive sensing system to determine for each of the plurality of individually identifiable locations: when a chess piece included in the plurality of conductive chess pieces is located at a respective one of the plurality of individually identifiable locations and user-contact with the chess piece is absent; and when the chess piece located at the respective one of the plurality of individually identifiable locations is in contact with the user, and
wherein the processor is configured to output a signal to illuminate at least two of the individually identifiable locations when the chess piece located at the respective one of the plurality of individually identifiable locations is in contact with the user, the illumination indicative of a move strength.

13. The electronic chess set of claim 12, wherein the plurality of conductive chess pieces are manufactured from a substantially non-conductive plastic blended with a conductive material.

14. The electronic chess set of claim 12, wherein the capacitive sensing system includes mutual capacitance circuitry included in a flexible substrate.

15. The electronic chess set of claim 12, wherein the chessboard includes a series of layers stacked together including a top layer that provides the playing surface,
wherein the electronic system includes an illumination system configured to illuminate each of the plurality individually identifiable locations of the playing surface, and
wherein the capacitive sensing system is located between the illumination system and the playing surface.

16. The electronic chess set of claim 15, wherein the electronic system includes user-interface circuitry independent of the capacitive sensing system, and
wherein the user-interface circuitry is employed to provide the electronic system with an ability to detect a selection by the user of one or more user inputs accessible at the top surface adjacent the playing surface.

17. The electronic chess set of claim 12, wherein the capacitive sensing system is configured to sense: a first capacitance value when the chess piece included in the plurality of conductive chess pieces is located at the respective one of the plurality of individually identifiable locations and user-contact with the chess piece is absent; and a second capacitance value when the user is in contact with the chess piece located at the respective one of the plurality of individually identifiable locations, the second capacitance value being different than the first capacitance value.

18. The electronic chess set of claim 12, wherein the plurality of conductive chess pieces are a solid mass of material having a shape of a chess piece, and
wherein conductivity of the solid mass is substantially uniform throughout the chess piece.

19. The electronic chess set of claim 12, wherein the plurality of conductive chess pieces each include a conductive coating applied to an exterior surface of the respective chess piece.

20. The electronic chess set of claim 12, wherein the electronic system is configured to identify the location of the single one of the plurality of conductive chess pieces at the respective one of the plurality of individually identifiable locations from among all of the plurality of individually identifiable locations by identifying a location having a largest change in capacitance.

* * * * *